US010325411B1

(12) United States Patent
Laney et al.

(10) Patent No.: US 10,325,411 B1
(45) Date of Patent: Jun. 18, 2019

(54) EGOCENTRIC ODOMETRY SYSTEM FOR MAINTAINING POSE ALIGNMENT BETWEEN REAL AND VIRTUAL WORLDS

(71) Applicant: The Charles Stark Draper Laboratory, Inc., Cambridge, MA (US)

(72) Inventors: James Laney, Wayne, PA (US); Richard W. Madison, Bedford, MA (US); Robert Truax, Canton, MA (US); Theodore J. Steiner, III, Boston, MA (US); Eric Jones, Natick, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 15/886,532

(22) Filed: Feb. 1, 2018

Related U.S. Application Data

(60) Provisional application No. 62/598,121, filed on Dec. 13, 2017.

(51) Int. Cl.
*G06T 19/00* (2011.01)
*G06F 3/01* (2006.01)
(Continued)

(52) U.S. Cl.
CPC ............ *G06T 19/006* (2013.01); *G06F 3/011* (2013.01); *G06T 19/003* (2013.01);
(Continued)

(58) Field of Classification Search
CPC ..... G06T 19/006; G06T 19/003; G06F 3/011; G06F 3/017; G06F 3/03; G02B 2027/014; G02B 2027/0187
See application file for complete search history.

(56) References Cited

U.S. PATENT DOCUMENTS

| 9,031,809 B1* | 5/2015 | Kumar ................. G01C 21/165 |
| | | 702/150 |
| 2004/0167716 A1* | 8/2004 | Goncalves ............. G01C 21/12 |
| | | 340/995.1 |

(Continued)

FOREIGN PATENT DOCUMENTS

WO    WO 2015/013418    1/2015

OTHER PUBLICATIONS

Apple, Inc., "Introducting ARKit," https://web.archive.org/web/20171124084747/https://developer.apple.com/arkit/, 2 pages, Nov. 24, 2017.
(Continued)

*Primary Examiner* — Edward Martello
(74) *Attorney, Agent, or Firm* — Sunstein Kann Murphy & Timbers LLP

(57) ABSTRACT

A navigation system provides pose, i.e., location and orientation, solutions using best available location information from two or more location systems. One of the location systems is a fiducial-based location system, which is accurate when a sufficient number of fiducials is recognized. However, when an insufficient number of fiducials is recognized, an odometry-based location system is used. Although the odometry-based location system is subject to drift, when a sufficient number of fiducials is recognized, the fiducial-based location system is used to correct the odometry-based location system. The navigation system provides robust, accurate and timely pose solutions, such as for augmented reality (AR) or virtual reality (VR) systems, without the time-consuming requirement to establish and localize many fiducials or the computational and memory requirements of pure fiducial-based location systems, and without the inherent drift of pure odometry-based location systems.

22 Claims, 5 Drawing Sheets

(51) Int. Cl.
G06F 3/03 (2006.01)
G02B 27/01 (2006.01)
(52) U.S. Cl.
CPC .............. G02B 2027/014 (2013.01); G02B 2027/0187 (2013.01); G06F 3/017 (2013.01); G06F 3/03 (2013.01)

(56) References Cited

U.S. PATENT DOCUMENTS

| | | |
|---|---|---|
| 2009/0248304 A1 | 10/2009 | Roumeliotis et al. |
| 2014/0316698 A1 | 10/2014 | Roumeliotis et al. |
| 2014/0333741 A1 | 11/2014 | Roumeliotis et al. |
| 2014/0341465 A1 | 11/2014 | Li et al. |

OTHER PUBLICATIONS

Castle, et al., "Towards simultaneous recognition, localization and mapping for hand-held and wearable cameras," Proceedings 2007 IEEE International Conference on Robotics and Automation, 6 pages, 2007.
Castle, et al., "Video-rate recognition and localization for wearable cameras," http://www.dcs.warwick.ac.uk/bmvc2007/proceedings/CD-ROM/papers/paper-97.pdf, 10 pages, 2007.
Castle, et al., "Video-rate Localization in Multiple Maps for Wearable Augmented Reality," 2008 12th IEEE International Symposium on Wearable Computers, 8 pages, 2008.
Chiu, et al., "Robust Vision-Aided Navigation Using Sliding-Window Factor Graphs," 2013 IEEE International Conference on Robotics and Automation (ICRA), 8 pages, 2013.
Forster, et al., "IMU Preintegration on a Manifold for Efficient Visual-Inertial Maximum-a-Posteriori Estimation," Robotics: Science and Systems, 10 pages, 2015.
Fraundorfer, et al., "Visual Odometry—Part II: Matching, Robustness, Optimization, and Applications," IEEE Robotics & Automation Magazine, vol. 19, No. 2, 13 pages, Jun. 2012.
Google Developers—ARCore, Dive right in, https://web.archive.org/web/20171124084856/https://developers.google.com/ar/, 2 pages, Nov. 24, 2017.
Google Developers—Tango, Tango, https://web.archive.org/web/20171003195445/developers.google.com/tango, 3 pages, Oct. 3, 2017.
Holmes, et al., "A Square Root Unscented Kalman Filter for visual monoSLAM," 2008 IEEE International Conference on Robotics and Automation, 7 pages, 2008.
Holmes, et al., "An $O(N^2)$ Square Root Unscented Kalman Filter for Visual Simultaneous Localization and Mapping," IEEE Transactions on Pattern Analysis and Machine Intelligence, 13 pages, 2008.
Huang, et al., "Towards Consistent Visual-Inertial Navigation," 2014 IEEE International Conference on Robotics and Automation (ICRA), 8 pages, 2014.
Kaess, et al., "iSAM2: Incremental Smoothing and Mapping Using the Bayes Tree," The International Journal of Robotics Research, vol. 31, No. 2, pp. 216-235, first published Dec. 20, 2011.
Klein, et al., "Tightly Integrated Sensor Fusion for Robust Visual Tracking," Department of Engineering, University of Cambridge, UK, 10 pages, 2002.
Klein, et al., "Robust Visual Tracking for Non-Instrumented Augmented Reality," Department of Engineering, University of Cambridge, UK, 10 pages, 2003.
Klein, et al., "Sensor Fusion and Occlusion Refinement for Tablet-based AR," Department of Engineering, University of Cambridge, UK, 10 pages, 2004.
Klein, et al., "Tightly integrated sensor fusion for robust visual tracking," Image and Vision Computing, No. 22, pp. 769-776, 2004.
Klein, et al., "A single-frame visual gyroscope," In Proc. British Machine Vision Conference (BMVC'05, Oxford), 10 pages, 2005.
Klein, "Visual Tracking for Augmented Reality," University of Cambridge, Department of Engineering, UK, Thesis paper, 193 pages, Jan. 2006.
Klein, et al., "Full-3D Edge Tracking with a Particle Filter," Department of Engineering Science, University of Oxford, UK, 10 pages, 2006.
Klein, et al., "Parallel Tracking and Mapping for Small AR Workspaces," Active Vision Laboratory, Department of Engineering Science, University of Oxford, UK, 10 pages, 2007.
Klein, et al., "Improving the Agility of Keyframe-Based SLAM," Active Vision Laboratory, University of Oxford, UK, 14 pages, 2008.
Klein, et al., "Compositing for Small Cameras," Active Vision Laboratory, Department of Engineering Science, University of Oxford, 4 pages, 2008.
Klein, "Parallel Tracking and Mapping for Small AR Workspaces—Usage Example," http://www.robots.ox.ac.uk/~gk/PTAM/usage.html, 1 page, Jan. 2009.
Klein, et al., "Parallel Tracking and Mapping on a Camera Phone," Active Vision Laboratory, Department of Engineering Science, University of Oxford, 4 pages, 2009.
Klein, et al., "Simulating Low-Cost Cameras for Augmented Reality Compositing," IEEE Transactions on Visualization and Computer Graphics, vol. 16, No. 3, 12 pages, May/Jun. 2010.
Klein, "Parallel Tracking and Mapping for Small AR Workspaces—Source Code," http://www.robots.ox.ac.uk/~gk/PTAM/, 2 pages, Feb. 2014.
Li, et al., "Consistency of EKF-Based Visual-Inertial Odometry," Department of Electrical Engineering, University of California, 24 pages, May 2012.
Li, et al., "Improving the Accuracy of EKF-Based Visual-Inertial Odometry," Department of Electrical Engineering, University of California, 8 pages, 2012.
Li, et al., "Optimization-Based Estimator Design for Vision-Aided Inertial Navigation," Department of Electrical Engineering, University of California, 8 pages, 2012.
Li, et al., "Optimization-Based Estimator Design for Vision-Aided Inertial Navigation: Supplemental Materials," Department of Electrical Engineering, University of California, 8 pages, 2012.
Li, et al., "Vision-aided Inertial Navigation for Resource-constrained Systems," IEEE/RSJ International Conference on Intelligent Robots and Systems, 7 pages, Oct. 2012.
Li, et al., "3-D Motion Estimation and Online Temporal Calibration for Camera-IMU Systems," Department of Electrical Engineering, University of California, 8 pages, 2013.
Li, et al., "High-precision, consistent EKF-based visual-inertial odometry," The International Journal of Robotics Research, vol. 32, No. 6, pp. 690-711, 2013.
Li, et al., "Real-time Motion Tracking on a Cellphone using Inertial Sensing and a Rolling-Shutter Camera," Department of Electrical Engineering, University of California, 8 pages, 2013.
Li, et al., "A Convex Formulation for Motion Estimation using Visual and Inertial Sensors," Department of Electrical and Computer Engineering, University of California, 6 pages, 2014.
Li, et al., "High-fidelity Sensor Modeling and Self-Calibration in Vision-aided Inertial Navigation," Department of Electrical Engineering, University of California, 8 pages, 2014.
Li, et al., "Online temporal calibration for camera-IMU systems: Theory and algorithms," The International Journal of Robotics Research, vol. 33, No. 7, pp. 947-964, 2014.
Montiel, et al., "Unified Inverse Depth Parametrization for Monocular SLAM," Proceedings of Robotics: Science and Systems, 8 pages, 2006.
Montiel, et al., "A Dual-Layer Estimator Architecture for Long-term Localization," Department of Computer Science and Engineering, University of Minnesota, 8 pages, 2008.
Mourikis, et al., "A Multi-State Constraint Kalman Filter for Vision-aided Inertial Navigation," Proceedings 2007 IEEE International Conference on Robotics and Automation, 8 pages, 2007.
Mourikis, et al., "Vision-Aided Inertial Navigation for Spacecraft Entry, Descent, and Landing," IEEE Transactions on Robotics, vol. 25, No. 2, 17 pages, Apr. 2009.

(56) References Cited

OTHER PUBLICATIONS

Scaramuzza, et al., "Visual Odometry, Part I: The First 30 Years and Fundamentals," IEEE Robotics and Automation Magazine, 13 pages, Dec. 2011.
Shelley, "Monocular Visual Inertial Odometry on a Mobile Device," Master's Thesis in Informatik, 104 pages, Aug. 18, 2014.
Solà, "Consistency of the monocular EKF-SLAM algorithm for 3 different landmark parametrizations," 2010 IEEE International Conference on Robotics and Automation, 6 pages, May 2010.
Thales Visionix, Visual-Inertial Navigation with InertiaCam, https://www.youtube.com/watch?v=gFsVLDzHh4s, published Jun. 9, 2016.
Thales Visionix, Inc., Game Changing Scorpion Helmet Mounted Cueing System, https://web.archive.org/web/20170701183247/http://www.thalesvisionix.com/, 1 page, Jul. 1, 2017.
Trawny, et al., "Indirect Kalman Filter for 3D Attitude Estimation," Technical Report, Department of Computer Science and Engineering, University of Minnesota, 25 pages, Mar. 2005.
Trawny, et al., "Jacobian for conversion from Euler Angles to Quatemions," Technical Report, Department of Computer Science and Engineering, University of Minnesota, 5 pages, Nov. 2005.
Triggs, et al., "Bundle Adjustment—A Modern Synthesis," Vision Algorithms, LNCS 1883, pp. 298-372, 2000.
Williams, et al., "Real-Time SLAM Relocalisation," Department of Engineering Science, University of Oxford, UK, 8 pages, 2007.

\* cited by examiner

EGOCENTRIC ODOMETRY SYSTEM FOR MAINTAINING POSE ALIGNMENT BETWEEN REAL AND VIRTUAL WORLDS

CROSS REFERENCE TO RELATED APPLICATIONS

This application claims the benefit of U.S. Provisional Patent Application No. 62/598,121, filed Dec. 13, 2017, titled "Egocentric Odometry for Maintaining Pose Alignment between Real and Virtual Worlds," the entire contents of which are hereby incorporated by reference herein, for all purposes.

TECHNICAL FIELD

The present invention relates to navigation systems and, more particularly, to navigation systems that combine inputs from fiducial-based and odometry-based location systems to estimate pose solutions, such as for augmented or virtual reality systems.

BACKGROUND ART

Many systems benefit from, or require, real-time information about location and/or orientation (pointing direction) of the systems. Examples include augmented reality (AR) glasses (head-mounted displays), guided munitions and aircraft. For example, an AR system needs information about its location in space and its pointing direction (collectively referred to as "pose") in order to accurately overlay graphics, such as virtual objects or text, on an image or view of the real world.

One conventional method for automatically determining pose involves use of reference points in the real world that are identified by visible marks ("fiducial markers" or simply "fiducials") and have known locations. Fiducials may be manually placed in a real world environment in which a system will operate, such as by adhering tags bearing matrix barcodes (often referred to as Quick Response Codes or "QR" codes) on objects in the real world. Optionally or alternatively, fiducials may be intrinsic to the environment, such as doorways, tables, signs or edges and corners of real world objects. Other methods for automatically determining pose involve illuminating a scene with structured visible or invisible, such infrared (IR), light, or measuring time-of-flight of light signals between objects and a camera to automatically measure distances to the objects.

However, many of these approaches rely on building a virtual map of the environment and then using the map to localize position. These approaches require significant computational resources and memory. In addition, they depend on static features in the environment to build and maintain the virtual map and are, therefore, brittle to changes in that environment. In other words, once a mapped feature moves, it must be re-mapped. Active systems, such as structured light systems, consume power flooding the environment with light. Furthermore, such active systems do not perform well or at all outdoors in direct sunlight.

Instead of fiducials or structured light, some systems use inertial measurement units (IMUs) to measure forces and angular rates of change (rotations) about one, two or three axes to ascertain system pose. However, IMU-based systems are known to accumulate error over time (drift) and to exhibit repeatability problems. Some IMU-based navigation systems include global positioning system (GPS) receivers to ascertain location, but not pointing direction, from satellite signals and occasionally correct for the drift in the IMU-based systems. However, GPS receivers require that their antennas have clear views of the sky, which may not be available inside buildings, in "urban canyons," or in other such environments where clear views of the sky are otherwise unavailable.

SUMMARY OF EMBODIMENTS

An embodiment of the present invention provides a navigation system. The navigation system operates within a reference frame. The navigation system includes a fiducial-based location system and an odometry-based location system. The fiducial-based location system is configured to use fiducials that are fixed, relative to the reference frame, to provide fiducial-based pose information. The navigation system also includes a navigation filter. The navigation filter is coupled to the fiducial-based location system to receive the fiducial-based pose information from the fiducial-based location system. The navigation filter is coupled to the odometry-based location system to receive odometry-based pose information from the odometry-based location system. The navigation filter is configured to repeatedly provide pose solutions. Each pose solution is based at least in part on the fiducial-based pose information when a sufficient number of the fiducials is recognized by the fiducial-based location system to provide the fiducial-based pose information, and on the odometry-based pose information when an insufficient number of the fiducials is recognized by the fiducial-based location system to provide the fiducial-based pose information.

The odometry-based location system may include an inertial measurement unit, a non-fiducial, vision-aided navigation unit, and/or a rotary encoder.

The navigation filter may be further configured to correct the odometry-based location system based at least in part on the fiducial-based pose information when a sufficient number of the fiducials is recognized by the fiducial-based location system to provide the fiducial-based pose information.

The fiducial-based location system may include an optical fiducial-based location system.

The fiducial-based location system may include a radio frequency fiducial-based location system.

The navigation filter may be configured to provide the pose solutions to a mixed reality system.

The reference frame may be moveable within a global reference frame. The navigation system may also include a third location system, distinct from the fiducial-based location system and distinct from the odometry-based location system. The third location system may be configured to automatically ascertain location or movement of the reference frame within the global reference frame. The navigation filter may be further configured, in providing the pose solutions, to compensate for the location or movement of the reference frame within the global reference frame.

The third location system may include a global positioning system receiver.

The fiducial-based location system may include a model of an environment. The model may include identifications of a plurality of physical features within the environment. Each physical feature of the plurality of physical features may represent a respective one of the fiducials.

The navigation system may also include a fourth location system, distinct from the fiducial-based location system and distinct from the odometry-based location system. Each pose solution may be based at least in part on location information from the fourth location system.

The fourth location system may include a global positioning system receiver, a LiDAR, an atmospheric pressure-based location system and/or a machine-learning-based localization system.

Another embodiment of the present invention provides a method for operating a navigation system within a reference frame. The method includes attempting to recognize a sufficient number of fiducials that are fixed, relative to the reference frame, to provide fiducial-based pose information. When a sufficient number of the fiducials is recognized, the fiducial-based pose information is provided. Odometry-based pose information is provided, independently of the fiducials and independently of the fiducial-based pose information. Pose solutions are repeatedly provided. A given pose solution is based at least in part on the fiducial-based pose information when a sufficient number of the fiducials is recognized. The pose solution is based on the odometry-based pose information when an insufficient number of the fiducials is recognized to provide the fiducial-based pose information.

Providing the odometry-based pose information includes using an odometry-based location system that includes an inertial measurement unit, a non-fiducial, vision-aided navigation unit and/or a rotary encoder to provide the odometry-based pose information.

Optionally, the odometry-based pose information may be corrected based at least in part on the fiducial-based pose information when a sufficient number of the fiducials is recognized to provide the fiducial-based pose information.

Using the fiducials that are fixed, relative to the reference frame, to provide the fiducial-based pose information may include using an optical fiducial-based location system or a radio frequency fiducial-based location system.

The pose solutions may be provided to a mixed reality system.

The reference frame may be moveable within a global reference frame. Location or movement of the reference frame within the global reference frame may be automatically ascertained, independently of the fiducials, the fiducial-based pose information and the odometry-based pose information. Providing the pose solutions may include automatically compensating for the location or movement of the reference frame within the global reference frame.

Automatically ascertaining location or movement of the reference frame within the global reference frame may include using a global positioning system receiver.

Providing the fiducial-based pose information may include using a model of an environment. The model may include identifications of a plurality of physical features within the environment. Each physical feature of the plurality of physical features may represent a respective one of the fiducials.

Additional location information may be provided from a location system, independently of the fiducials, independently of the fiducial-based pose information and independently of the odometry-based pose information. The pose solutions may be provided based at least in part on the additional location information.

The additional location information may be provided by a global positioning system receiver, a LiDAR, an atmospheric pressure-based location system and/or a machine-learning-based localization system.

Yet another embodiment of the present invention provides a non-transitory computer-readable medium encoded with instructions. When executed by a processor, the instructions establish processes for performing a computer-implemented method for operating a navigation system within a reference frame. The processes include a process configured to attempt to recognize a sufficient number of fiducials that are fixed, relative to the reference frame, to provide fiducial-based pose information. A process is configured to, when a sufficient number of the fiducials is recognized, provide the fiducial-based pose information. A process is configured to provide odometry-based pose information, independently of the fiducials and independently of the fiducial-based pose information. A process is configured to repeatedly provide pose solutions, including basing a given pose solution at least in part on the fiducial-based pose information when a sufficient number of the fiducials is recognized, and basing the pose solution on the odometry-based pose information when an insufficient number of the fiducials is recognized to provide the fiducial-based pose information.

BRIEF DESCRIPTION OF THE DRAWINGS

The invention will be more fully understood by referring to the following Detailed Description of Specific Embodiments in conjunction with the Drawings, of which.

DETAILED DESCRIPTION OF SPECIFIC EMBODIMENTS

Figure 1:
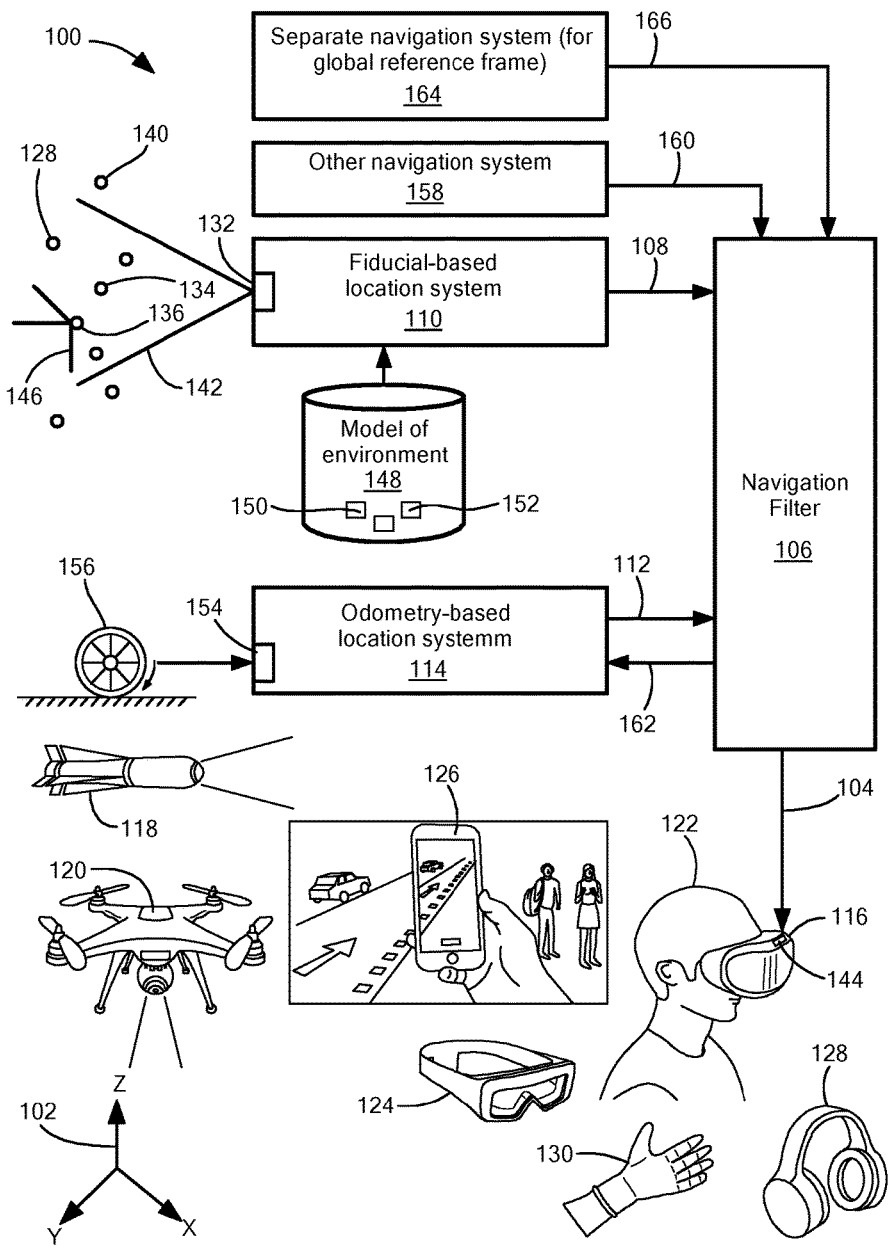
FIG. 1 is a schematic diagram of a navigation system, according to an embodiment of the present invention.

Embodiments of the present invention provide navigation systems that provide pose, i.e., location and orientation, solutions using best available location information from two or more location systems. One of the location systems is a fiducial-based location system, which is accurate when a sufficient number of fiducials is recognized. However, when an insufficient number of fiducials is recognized, an odometry-based location system is used. Although the odometry-based location system is subject to drift, when a sufficient number of fiducials is recognized, the fiducial-based location system is used to correct the odometry-based location system. These embodiments provide robust, accurate and timely pose solutions, such as for augmented reality (AR) or virtual reality (VR) systems, without the time-consuming requirement to establish and localize many fiducials, or the computational and memory requirements, of pure fiducial-based location systems, and without the inherent drift of pure odometry-based location systems.

As used herein, pose means location in three-dimensional space of a camera or other sensor or a living being (a "user"), and orientation, i.e., direction, such as angles relative to axes of a reference frame, in which the camera or other sensor or the user is aimed.

As used herein, a fiducial-based location system is a system that includes a sensor to detect fiducials that are fixed in place, relative to a reference frame in which the fiducial-based location system operates. Thus, the global positioning system (GPS) is not a fiducial-based location system, because GPS satellites orbit the earth (not in geosynchronous orbits) and are not, therefore, fixed in place, relative to the reference frame used by the GPS. A fiducial-based location system detects the fiducials, such as with a camera, and uses apparent locations of, or angles or distances to, the detected fiducials to automatically calculate the camera's pose, relative to the reference frame.

Fiducials may be passive or active. Passive fiducials do not generate signals. That is, passive fiducials merely reflect signals, such as visible or invisible (to humans) light, audible or inaudible (to humans) sound or radio frequency (RF) signals. Examples of passive fiducials include reflective visual markers paced on objects within a scene. Passive fiducial markers may be illuminated by natural light, such as from the sun, or they may be illuminated by artificial light, such as from lamps that are parts of the scene or by lamps or sonic generators in fiducial-based location systems. Some fiducial-based location systems use intrinsic aspects, such as corners or edges, of objects, or recognize the objects themselves, such as doors or tables, in the scene, rather than, or in addition to, markers placed on the objects.

Active fiducials generate signals of their own. Examples include RF transmitters used by an RF receiver to measure angles and/or distances to the transmitters, such as by steering a phased array of antennas or measuring time-difference of arrival (TDOA) of signals from the transmitters.

As used herein, mixed reality system means a computer system that delivers stimulation to a living being (a "user"), where some aspect of the stimulation depends on pose of a camera or other sensor or of the user. The stimulation may be visual, auditory, haptic and/or olfactory. The stimulation is designed to represent something real or virtual in 2- or 3-dimensional space, such as a table, chair, doorway, pipe, text or real or fictional being. Examples of mixed reality systems include, but are not limited to, virtual reality (VR) systems, in which everything presented to the user is virtual and not mapped onto the real environment of the user, and augmented reality (AR) systems, in which the user perceives at least a portion of the real environment with the presentations mapped on the real environment.

FIG. 1 is a schematic diagram of a navigation system 100, according to an embodiment of the present invention. The navigation system 100 operates within a reference frame, represented by three mutually-orthogonal axes 102. That is, as the navigation system 100 changes pose within the reference frame 102, the navigation system 100 outputs real-time pose solutions 104 to another system. A navigation filter 106 receives fiducial-based pose information 108 from a fiducial-based location system 110, and odometry-based pose information 112 from an odometry-based location system 114.

In the embodiment shown in FIG. 1, the navigation system 100 provides real-time pose solutions 104 to a mixed reality system 116, although in other embodiments the pose solutions 104 may be provided to another system, such as a guided munition 118, a manned or unmanned aircraft 120 or ground robot (not shown). The mixed reality system 116 may use the real-time pose solutions 104 to select where to display or overlay graphics, such as virtual objects or text, on an image or view of the real world, or on an image of a virtual world, as a user 122 changes his or her pose within the reference frame 102. Examples of output devices that may be used by the mixed reality system 116 include VR goggles (such as HTC Vive virtual reality system available from Samsung Electronics Co., Ltd., 85 Challenger Road, Ridgefield Park, N.J. 07660 or Oculus Rift virtual reality system available from Oculus VR, LLC, 19800 MacArthur Boulevard, Suite 200, Irvine, Calif. 92612), AR glasses 124 (such as Daqri Smart Glasses augmented reality display available from Daqri, 1201 W. 5th Street, Suite T-900, Los Angeles Calif., 90017, HoloLens augmented reality display available from Microsoft Corporation, 700 Bellevue Way, Bellevue, Wash. 98804 or Google Glass display available from Google LLC, 1600 Amphitheatre Parkway, Mountain View, Calif. 94043), mobile phone or tablet displays 126, stereophonic or 3-dimensional (3D) audio headphones 128 and haptic gloves 130. Although embodiments are described as providing graphic outputs, other embodiments provide auditory, haptic and/or olfactory outputs.

For clarity, the navigation filter 106 is shown separate from the fiducial-based location system 110 and the odometry-based location system 114. However, these items can share components.

The fiducial-based location system 110 uses an appropriate sensor 132, such as a visible light or infrared (IR) camera, to detect and recognize fiducials, represented by fiducials 134, 136 and 138, within the fiducial-based location system's 110 field of view 142. At any given time, some or all of the fiducials may be outside the field of view 142 of the sensor 132, as exemplified by fiducial 140. The navigation system 100 is configured such that the field of view 142 of the sensor 132 changes in correlation with changes in the user's 122 pose. For example, the mixed reality system 116 may include a camera 144 that remains oriented in the direction of the user's 122 pose. The fiducials 134-140 may be markers placed on objects, and/or the fiducials 134-140 may be intrinsic to objects in the scene, for example corners of a table, as exemplified by corner 146.

Figure 2:
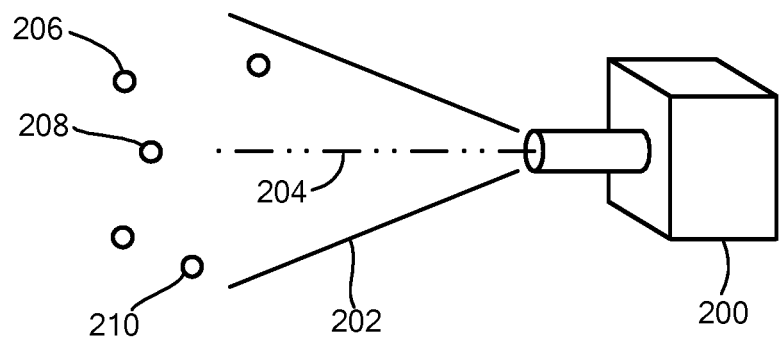
FIG. 2 is a schematic diagram of a camera having a field of view and an optical axis and that may be used in a fiducial-based location system within the navigation system of FIG. 1, according to an embodiment of the present invention.

As noted, in some embodiments, the fiducial-based location system 110 includes an optical fiducial-based location system. FIG. 2 is a schematic diagram of a camera 200 having a field of view 202 and an optical axis 204, which corresponds with the camera's 200 pose. The camera 200 is shown with several fiducials, represented by fiducials 206, 208 and 210, within the field of view 202. Alternatively, the fiducial-based location system 106 (FIG. 1) may be implemented with a structured (visible or invisible to humans) light system (not shown).

Figure 3:
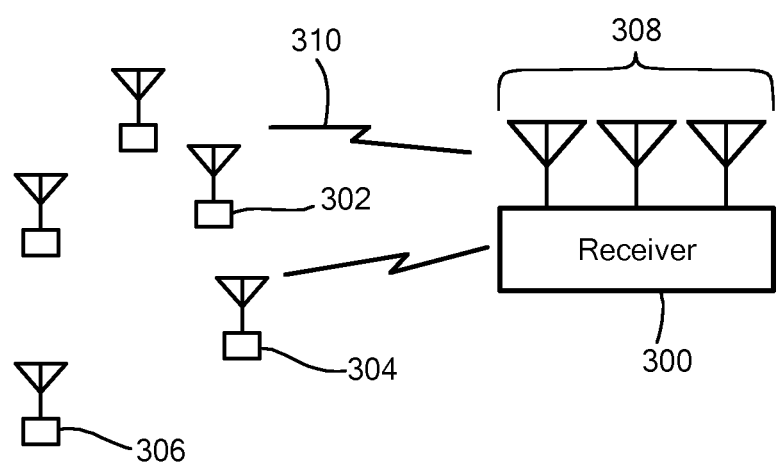
FIG. 3 is a schematic diagram of a radio frequency (RF) receiver and several RF transmitters which, collectively, may be used as a fiducial-based location system within the navigation system of FIG. 1, according to an embodiment of the present invention.

In some embodiments, the fiducial-based location system 110 includes a radio frequency (RF) fiducial-based location system. For example, the sensor 132 (FIG. 1) may be an RF receiver 300, as shown schematically in FIG. 3, and the fiducials 134-140 (FIG. 1) may be RF transmitters or transponders, represented by RF transmitters 302, 304 and 306 in FIG. 3. The RF receiver 300 may have one or more antennas 308. The antennas 308 may be arranged as a phase array of antennas, to facilitate steering the antenna's 308 sensitivity and, thereby, deducing pose of the receiver 300 from relative signal strengths of the received signals. Multiple antennas 308 may be used to measure TDOA of signals, such as signal 310, from one or more of the RF transmitters 302-306. Thus, the receiver's 300 pose may be deduced from ranges to several of the RF transmitters 302-306 and relative strengths of signals received from the RF transmitters 302-306. The very-high frequency (VHF) omni-directional radio range (VOR) system is an example of an RF fiducial-based location system.

Returning to FIG. 1, the fiducial-based location system 110 automatically estimates the user's 122 pose by measuring apparent movement of recognized fiducials 134-140, from frame to frame or sample to sample, within the field of view 142.

Optionally, the fiducial-based location system 110 includes a model 148 of an environment, in which the fiducial-based location system operates. The model 148 may include information, represented at 150 and 152, about physical features within the environment, such as descriptions and locations of corners or edges of objects that may serve as fiducials, including identifications of the features. Each physical feature may represent a respective one of the fiducials 134-140. The model 148 may also describe expected or possible changes in images of the environment, as a result of anticipated movements of the navigation system 100, for example changes in reflectivity depending on illumination angle and view angle, as a result of anticipated movements of a person, drone or other moving platform. The model 148 may be used to automatically identify physical features in the environment on which fiducials markers should be placed, and/or the model 148 may be used to automatically identify physical features in the environment that the fiducial-based location system 110 should treat as intrinsic fiducials, thereby facilitating initialization of pose by the fiducial-based location system 110, which is required to begin calculating the odometry-based pose information 112.

The odometry-based location system 114 includes a sensor 154, such as a rotary encoder mechanically coupled to a ground-engaged wheel 156 to measure rotation of the wheel 156. The odometry-based location system 114 measures movements, forces and/or angular rates of change, such as about one, two or three axes, relative to the reference frame 102 to ascertain pose, as the navigation system 100, or the user 122, moves. Alternative odometry-based location systems 114 may include inertial measurement units (IMUs), non-fiducial vision-aided navigation (VAN) units that utilize humanly visible or invisible light, velocimeters, radars, stereo cameras or other types of sensors. For example, U.S. Pat. No. 8,443,662, titled "Geo-location systems and methods based on atmospheric pressure measurement," the entire contents of which are hereby incorporated by reference herein for all purposes, describes a system that uses barometric pressure readings taken in the vicinity of a device and correlated to datasets of barometric pressure that have pressure gradients over time and space to automatically determine a location of, or path taken by, the system.

Optionally, one or more other sensors and/or location systems, collectively indicated at 158, provide additional pose and/or location information 160 to the navigation filter 106. Examples of the other sensors and/or location systems 158 include: a GPS receiver, a light detection and ranging (LiDAR) system, an atmospheric pressure-based location system, an IMU-based systems, a fiber optic gyroscopic system, a machine-learning-based localization system and the odometry-based location systems described above. It should be noted that, at any given time, the other sensor(s) 158 may not be able to provide the pose and/or location information 160, for example when a GPS receiver's antenna does not have a clear view of a sufficient number of GPS satellites.

A machine-learning-based localization system includes a sensor, such as a camera sensitive to visible or invisible (to humans) light, that is configured to observe a field of view as the system moves, and to use the observed view to estimate pose, without reliance on predefined fiducials. Prior to use, the machine-learning-based localization system is trained with real or simulated views designed to represent possible or likely views. The machine-learning-based localization system automatically learns features in the training views that it can then use to estimate pose from real views.

As noted, the navigation filter 106 repeatedly provides real-time pose solutions 104 to the augmented reality system 116. To estimate each pose solution, the navigation filter 106 uses the best pose information then available from the fiducial-based location system 110, the odometry-based location system 114 and any other sensors and/or location systems 158. For example, the pose information 108 provided by the fiducial-based location system 110 is considered to be more accurate than the pose information 112 from the odometry-based location system 114, because the fiducial-based location system 110 does not drift, whereas the odometry-based location system 114 is subject to drift.

Therefore, when a sufficient number of the fiducials 134-138 is recognized by the fiducial-based location system 110 to provide, or sufficiently accurately provide, the fiducial-based pose information 108, the navigation filter 106 bases the pose solution 104, at least in part, on the pose information 108 from the fiducial-based pose system 110. However, when an insufficient number, such as zero or fewer than four, of the fiducials 134-138 is recognized by the fiducial-based location system 110 to provide, or sufficiently accurately provide, the fiducial-based pose information 108, the navigation filter 106 bases the pose solution 104, at least in part, on the pose information 112 from the odometry-based location system 114. In addition, when a sufficient number of the fiducials 134-138 is recognized by the fiducial-based location system 110 to provide the fiducial-based pose information 108, the navigation filter 106 may send a correction signal 162 to the odometry-based location system 114 to correct drift or other error in the odometry-based location system 114.

As noted, the navigation system 100 operates within a reference frame 102. The reference frame 102 may be fixed, such as relative to earth. For example, if the navigation system 100 is used within a room in an immobile house, and the reference frame 102 is fixed relative to the room, as the user 122 changes pose, such as by moving about the room, the mixed reality system 116 accurately overlays graphics, such as virtual objects or text, on an image or view of the room. That is, the location within the display of the graphics overlays change as the user's 122 pose changes, so the overlays appear to remain registered on features of the room.

Figure 4:
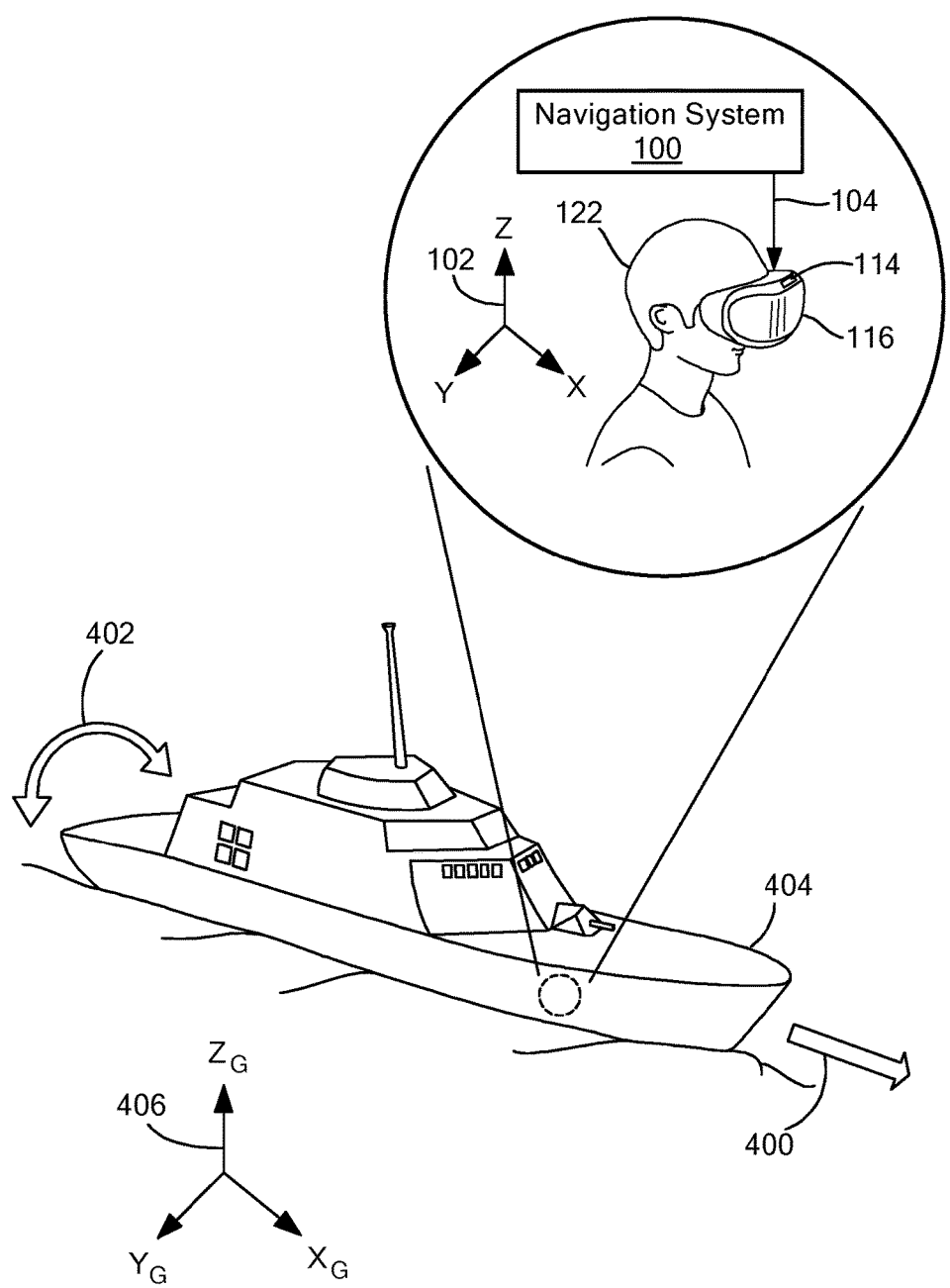
FIG. 4 is a schematic diagram of a navigation system that may move within a global reference frame, according to an embodiment of the present invention.

In some contexts, however, the reference frame 102 in which the navigation system 100 operates moves, relative to earth or relative to some other reference frame, such as the solar system. For example, the navigation system 100 may be used aboard a moving 400 or rolling 402 ship 404, as schematically illustrated in FIG. 4. If the odometry-based location system 114 (FIG. 1) were implemented with an IMU, the IMU would detect the movement 400 or rolling 402 of the ship 402. However, a fiducial-based location system 110 that uses fiducials 134-140 (FIG. 1) fixed to walls of a room onboard the ship 404 would not detect the movement 400 or rolling 402 of the ship 404 and would, therefore, provide pose information 108 (FIG. 1) that is inconsistent with the pose information 112 provided by the odometry-based location system 114.

Thus, in some contexts, it may be desirable for the navigation system 100 to act as though the room, or the entire ship 404, within which the navigation system 100 is used remains stationary, relative to the reference frame 102. The ship 404 and the reference frame 102 may be thought of as moving within a global reference frame, represented by three mutually-orthogonal axes 406. In such a case, one of the other navigation systems 158, or a separate navigation system 164, such as a GPS receiver, that provides location or pose information 166 (FIG. 1) relative to the global reference frame 406 may be used to compensate for the location or movement of the ship 404. The navigation filter 106 adjusts the pose information 112 from the odometry-based location system 114 to effectively remove the location or movement of the reference frame 102 within the global reference frame 406.

Figure 5A:
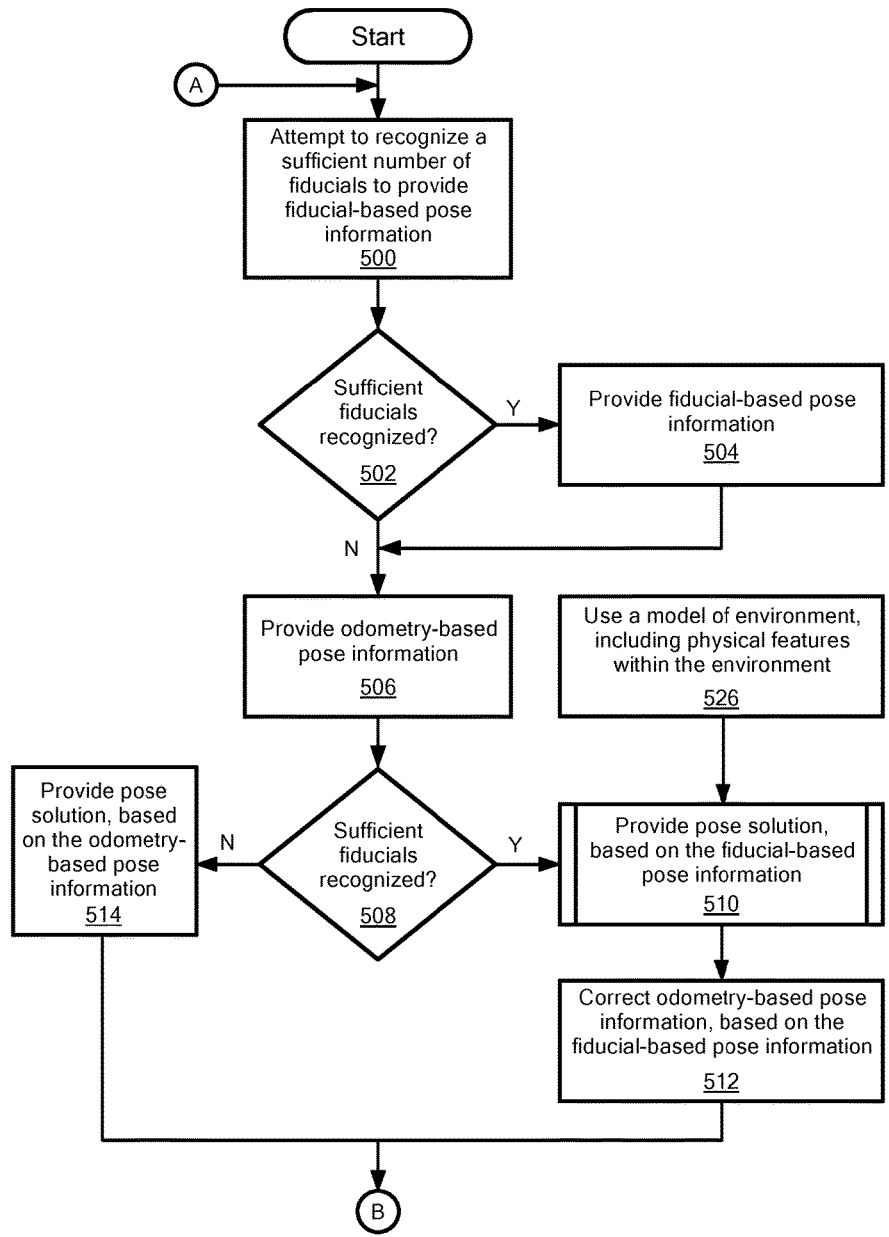
FIGS. 5(a) and 5(b) collectively form a flow chart schematically illustrating operations performed by the navigation system of FIGS. 1 and 4, according to an embodiment of the present invention.
Figure 5B:
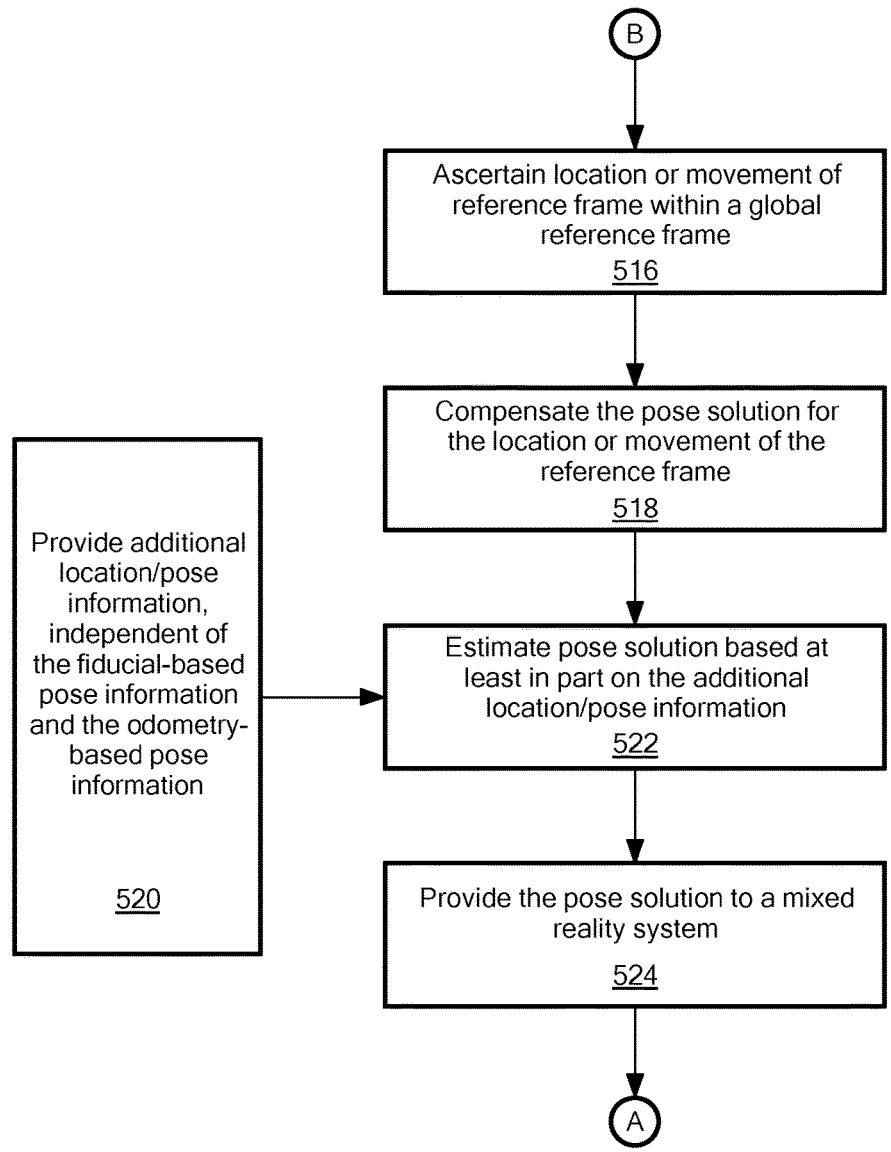

FIGS. 5(a) and 5(b) collectively form a flow chart schematically illustrating operations performed by the navigation system 100, according to an embodiment of the present invention. At 500, an attempt is made to recognize a sufficient number of the fiducials 134-140 that are fixed, relative to the reference frame 102, to the provide fiducial-based pose information 108. At 502, a check is made to determine whether a sufficient number of the fiducials 134-140 were recognized. For example, the number of fiducials 134-140 that were recognized may be compared to a predetermined number, such as 3 or 4, or to a calculated number, based on a desired confidence level in the pose information 110. If the sufficient number of fiducials 134-140 were recognized, control passes to 504, where the fiducial-based pose information 110 is provided.

However, if an insufficient number of the fiducials 134-140 were recognized, control passes to 506, where the odometry-based location system provides the odometry-based pose information 112. If the sufficient number of fiducials 134-140 were recognized, at 508 control passes to 510, where the navigation filter 106 provides the pose solution 104 based at least in part on the fiducial-based pose information 110. In addition, if the sufficient number of fiducials 134-140 were recognized, at 512 the odometry-based pose information 112, and the odometry-based navigation system 114, is corrected, based on the fiducial-based pose information 110.

On the other hand, if an insufficient number of fiducials 134-140 were recognized, control passes to 514, where the navigation filter 106 provides the pose solution 104 based at least in part on the odometry-based pose information 112. In either case, control passes to 516, where, optionally, the location or movement of the reference frame 102 within a global reference frame 406 is ascertained. At 518, the location or movement of the reference frame 102 within the global reference frame 406 is optionally used to compensate the pose solution 104.

Optionally, at 520, the other navigation system(s) 158 are used to provide additional location and/or pose information 160 to the navigation filter 106, and at 522 this additional location and/or pose information 160 is used, at least in part, to estimate the pose solution 104.

At 524, the estimated pose solution 104 is provided to a mixed reality system 116 or to another system, such as the guided munition 118, the aircraft 120 or a ground robot (not shown).

Optionally, at 526, a model of the environment may be used to provide the pose solution based on the fiducial-based pose information 108.

Thus, when a sufficient number of the fiducials 134-140 is in view, the navigation filter 106 uses them. However, when an insufficient number of the fiducials 134-140 is in view, the navigation filter 106 seamlessly switches to the odometry-based navigation information 112. The result is a tracking system that always provides the best available, most accurate pose solution 104 to the mixed reality system 116. In addition, the navigation filter 106 treats fixes from fiducials as ground truth, and the navigation filter 106 automatically updates the calculated odometry-based solution and removes accumulated error.

Advantageously, embodiments of the present invention need not build a virtual map of the environment or use such a map to estimate poses, thereby requiring fewer computational and memory resources (and therefore less power and volume) than prior art systems. Lower power and volume requirements facilitate longer operations, larger distances over which accurate solutions can be calculated and, therefore, greater portability. Furthermore, embodiments of the present invention calculate odometry in only an egocentric manner, i.e., no off-board processing is required, they do not require any advance information about the environment in which they are to operate, and performance is not affected by changes in the environment, unlike systems that rely on simultaneous mapping and localization (SLAM), which assume their environments are static.

The navigation filter 106, the fiducial-based location system 110, the odometry-based location system 114, the other navigation system 158, the separate navigation system 144 and the model 148 may be fully or partially implemented by one or more processors executing instructions stored in a memory. The instructions may, for example, implement algorithms, such as those illustrated in FIGS. 5(a)-(b) and as described herein.

While the invention is described through the above-described exemplary embodiments, modifications to, and variations of, the illustrated embodiments may be made without departing from the inventive concepts disclosed herein. For example, although specific types of fiducial-based location systems and specific types of odometry-based location systems may be recited in relation to disclosed embodiments, within the scope of the invention, other types of these system may be used. Unless otherwise indicated in context, or would be understood by one of ordinary skill in the art, terms such as "about" mean within ±20%.

As used herein, including in the claims, the term "and/or," used in connection with a list of items, means one or more of the items in the list, i.e., at least one of the items in the list, but not necessarily all the items in the list. As used herein, including in the claims, the term "or," used in connection with a list of items, means one or more of the items in the list, i.e., at least one of the items in the list, but not necessarily all the items in the list.

As used herein, including in the claims, an element described as configured to perform an operation "or" another operation, for example "a third location system configured to automatically ascertain location or movement of the reference frame within the global reference frame," is met by an element that is configured to perform one of the operations. That is, the element need not be configured operate in one mode in which it performs one of the operations, and in another mode in which it performs the other operation. The element may, but need not, be configured to perform more than one of the operations.

For example, "automatically ascertaining location or movement of the reference frame within the global reference frame" means: (a) automatically ascertaining location of the reference frame within the global reference frame, or (b) automatically ascertaining movement of the reference frame within the global reference frame or (c) automatically ascertaining location and movement of the reference frame within the global reference frame. "Automatically ascertaining location or movement of the reference frame within the global reference frame" does not necessarily require an ability to operate in two modes, where in one mode the location is automatically ascertained, and in the other mode the movement is automatically ascertained.

"Or" does not mean "exclusive or."

Some embodiments of the navigation filter 106, the fiducial-based location system 110, the odometry-based location system 114, the other navigation system 158, the separate navigation system 144 and the model 148 have been described as including a processor controlled by instructions stored in a memory. The memory may be random access memory (RAM), read-only memory (ROM), flash memory or any other memory, or combination thereof, suitable for storing control software or other instructions and data.

Although aspects of embodiments may be described with reference to flowcharts and/or block diagrams, functions, operations, decisions, etc. of all or a portion of each block, or a combination of blocks, may be combined, separated into separate operations or performed in other orders. Those skilled in the art should readily appreciate that functions, operations, decisions, etc. of all or a portion of each block, or a combination of blocks, of the flowcharts or block diagrams may be implemented as computer program instructions, software, hardware, firmware or combinations thereof.

Those skilled in the art should also readily appreciate that instructions or programs defining the functions of any embodiment may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

Disclosed aspects, or portions thereof, may be combined in ways not listed above and/or not explicitly claimed. In addition, embodiments disclosed herein may be suitably practiced, absent any element that is not specifically disclosed herein. Accordingly, the invention should not be viewed as being limited to the disclosed embodiments.

What is claimed is:

1. A navigation system for operation within a reference frame, the navigation system comprising:
    a fiducial-based location system configured to use fiducials that are fixed, relative to the reference frame, to provide fiducial-based pose information about the navigation system, relative to the reference frame, wherein the reference frame is moveable within a global reference frame;
    an inertial odometry-based location system configured to automatically provide inertial odometry-based pose information about the navigation system;
    a third location system, distinct from the inertial odometry-based location system and distinct from the fiducial-based location system, the third location system being configured to automatically provide information about pose of the reference frame, relative to the global reference frame; and
    a navigation filter that is:
        coupled to the fiducial-based location system to receive the fiducial-based pose information therefrom;
        coupled to the inertial odometry-based location system to receive the inertial odometry-based pose information therefrom;
        coupled to the third location system to receive therefrom the information about the pose of the reference frame, relative to the global reference frame; and
        configured to repeatedly automatically provide pose solutions, wherein:
            at least some of the pose solutions are based at least in part on the inertial odometry-based pose information; and
            each pose solution that is based at least in part on the inertial odometry-based pose information is compensated for the pose of the reference frame, relative to the global reference frame.

2. A navigation system according to claim 1, wherein the navigation filter is further configured to correct the inertial odometry-based location system based at least in part on the fiducial-based pose information when a sufficient number of the fiducials is recognized by the fiducial-based location system to provide the fiducial-based pose information.

3. A navigation system according to claim 1, wherein the fiducial-based location system comprises an optical fiducial-based location system.

4. A navigation system according to claim 1, wherein the fiducial-based location system comprises a radio frequency fiducial-based location system.

5. A navigation system according to claim 1, wherein the navigation filter is configured to provide the pose solutions to a mixed reality system.

6. A navigation system according to claim 1, wherein the third location system comprises an inertial odometry-based location system.

7. A navigation system according to claim 1, wherein:
    the fiducial-based location system comprises a model of an environment;
    the model includes identifications of a plurality of physical features within the environment; and
    each physical feature of the plurality of physical features represents a respective one of the fiducials.

8. A navigation system according to claim 1, further comprising:
    a fourth location system, distinct from the fiducial-based location system, distinct from the inertial odometry-based location system and distinct from the third location system; and
    wherein each pose solution is based at least in part on location information from the fourth location system.

9. A navigation system according to claim 8, wherein the fourth location system comprises one or more of:
    a global positioning system receiver;
    a LiDAR;
    an atmospheric pressure-based location system; and
    a machine-learning-based localization system.

10. A navigation system according to claim 1,
    wherein the navigation filter is configured such that:
        at least some of the pose solutions are based at least in part on the fiducial-based pose information; and
        each pose solution that is based at least in part on the fiducial-based pose information is based at least in part on the fiducial-based pose information when a sufficient number of the fiducials is recognized by the fiducial-based location system to provide the fiducial-based pose information.

11. A system according to claim 1, wherein the navigation filter is further configured to correct the inertial odometry-based pose information based at least in part on the fiducial-based pose information when a sufficient number of the fiducials is recognized to provide the fiducial-based pose information.

12. A method for operating a navigation system within a reference frame, the method comprising:
automatically providing, by a fiducial-based location system configured to use fiducials that are fixed, relative to the reference frame, fiducial-based pose information about the navigation system, relative to the reference frame, wherein the reference frame is moveable within a global reference frame;
automatically providing, by an inertial odometry-based location system, inertial odometry-based pose information about the navigation system;
automatically providing, by a third location system, distinct from the fiducial-based location system and distinct from the inertial odometry-based location system, information about pose of the reference frame, relative to the global reference frame; and
repeatedly automatically providing, by a navigation filter, pose solutions, wherein at least some of the pose solutions are based at least in part on the inertial odometry-based pose information, including:
automatically compensating each pose solution that is based at least in part on the inertial odometry-based pose information for the pose of the reference frame, relative to the global reference frame.

13. A method according to claim 12, further comprising correcting the inertial odometry-based pose information based at least in part on the fiducial-based pose information when a sufficient number of the fiducials is recognized to provide the fiducial-based pose information.

14. A method according to claim 12, wherein using the fiducials that are fixed, relative to the reference frame, to provide the fiducial-based pose information comprises using an optical fiducial-based location system.

15. A method according to claim 12, wherein using the fiducials that are fixed, relative to the reference frame, to provide the fiducial-based pose information comprises using a radio frequency fiducial-based location system.

16. A method according to claim 12, further comprising providing the pose solutions to a mixed reality system.

17. A method according to claim 12, wherein automatically providing, by the third location system, the information about the pose of the reference frame, relative to the global reference frame, comprises using an inertial odometry-based location system.

18. A method according to claim 12, wherein providing the fiducial-based pose information comprises using a model of an environment, wherein the model includes identifications of a plurality of physical features within the environment, and each physical feature of the plurality of physical features represents a respective one of the fiducials.

19. A method according to claim 12, further comprising:
providing additional location information from a location system, independently of the fiducials, independently of the fiducial-based pose information, independently of the inertial odometry-based pose information and independently of the information about the pose of the reference frame; and
wherein providing the pose solutions comprises providing the pose solutions based at least in part on the additional location information.

20. A method according to claim 19, wherein providing the additional location information from the location system comprises providing the additional location information by one or more of:
a global positioning system receiver;
a LiDAR;
an atmospheric pressure-based location system; and
a machine-learning-based localization system.

21. A non-transitory computer-readable medium encoded with instructions that, when executed by a processor, establish processes for performing a computer-implemented method for operating a navigation system within a reference frame, the processes comprising:
a process configured to automatically provide, by a fiducial-based location system configured to use fiducials that are fixed, relative to the reference frame, fiducial-based pose information about the navigation system, relative to the reference frame, wherein the reference frame is moveable within a global reference frame;
a process configured to automatically provide, by an inertial odometry-based location system, inertial odometry-based pose information about the navigation system;
a process configured to automatically provide, by a third location system, distinct from the inertial odometry-based location system and distinct from the fiducial-based location system, information about pose of the reference frame, relative to the global reference frame; and
a process configured to repeatedly provide, by a navigation filter, pose solutions, wherein at least some of the pose solutions are based at least in part on the inertial odometry-based pose information, including:
automatically compensating each pose solution that is based at least in part on the inertial odometry-based pose information for the pose of the reference frame.

22. A method according to claim 12, further comprising:
automatically attempting to recognize, by the fiducial-based location system, a sufficient number of the fiducials to provide the fiducial-based pose information;
when the sufficient number of the fiducials is recognized by the fiducial-based location system, automatically providing, by the fiducial-based location system, the fiducial-based pose information, independently of the inertial odometry-based navigation system;
wherein automatically providing the inertial odometry-based pose information about the navigation system comprises automatically providing, by the inertial odometry-based location system, the inertial odometry-based pose information about the navigation system independently of the fiducials and independently of the fiducial-based pose information; and
wherein repeatedly automatically providing, by the navigation filter, the pose solutions comprises basing a given pose solution at least in part on the fiducial-based pose information when the sufficient number of the fiducials is recognized.

* * * * *